April 18, 1961
W. F. KLEMM
2,980,099
MOISTENING AND HEATING DEVICE
Filed May 24, 1954
6 Sheets-Sheet 1
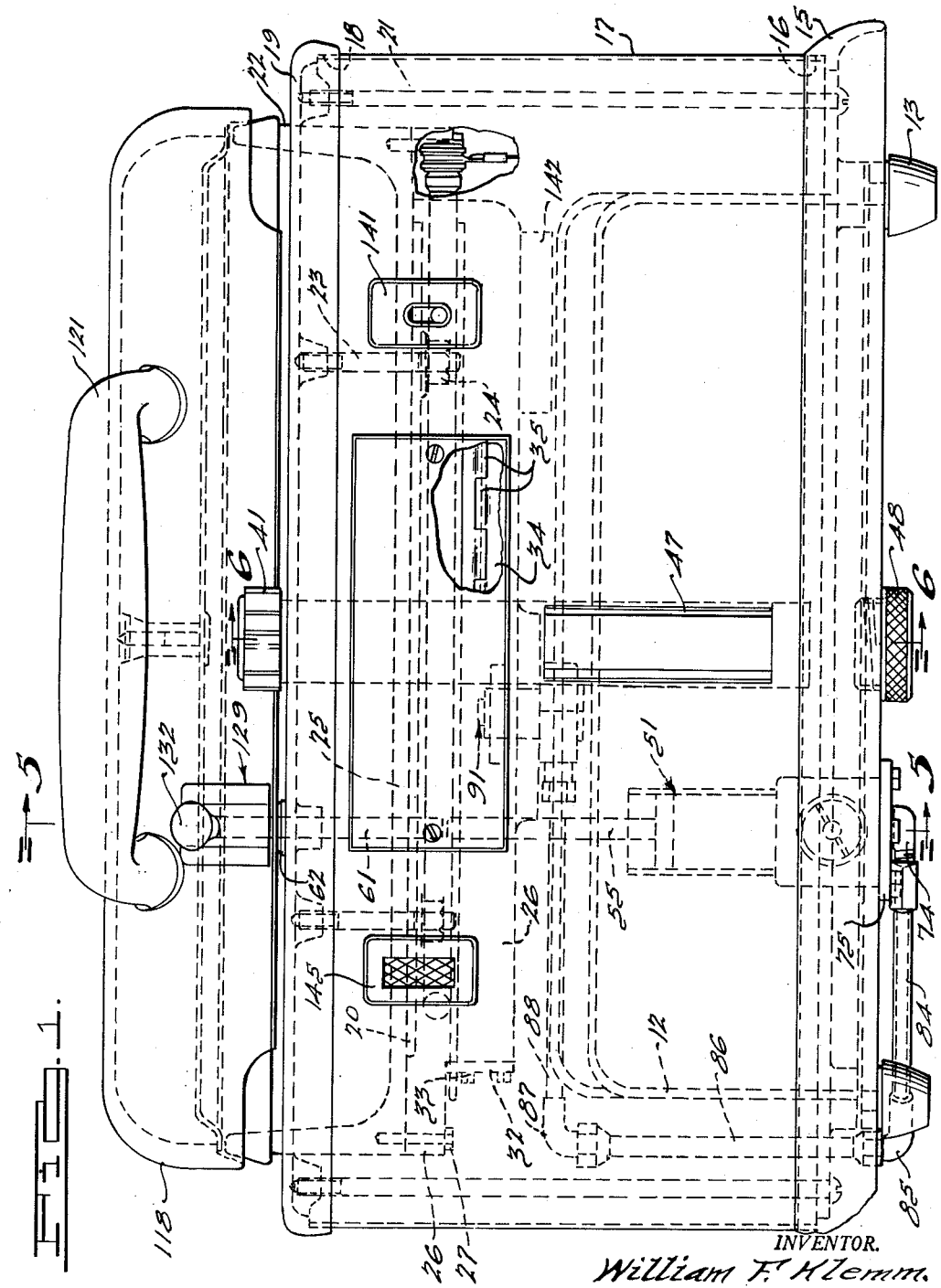
INVENTOR.
William F. Klemm.
BY
Harness, Dickey & Pierce
ATTORNEYS.

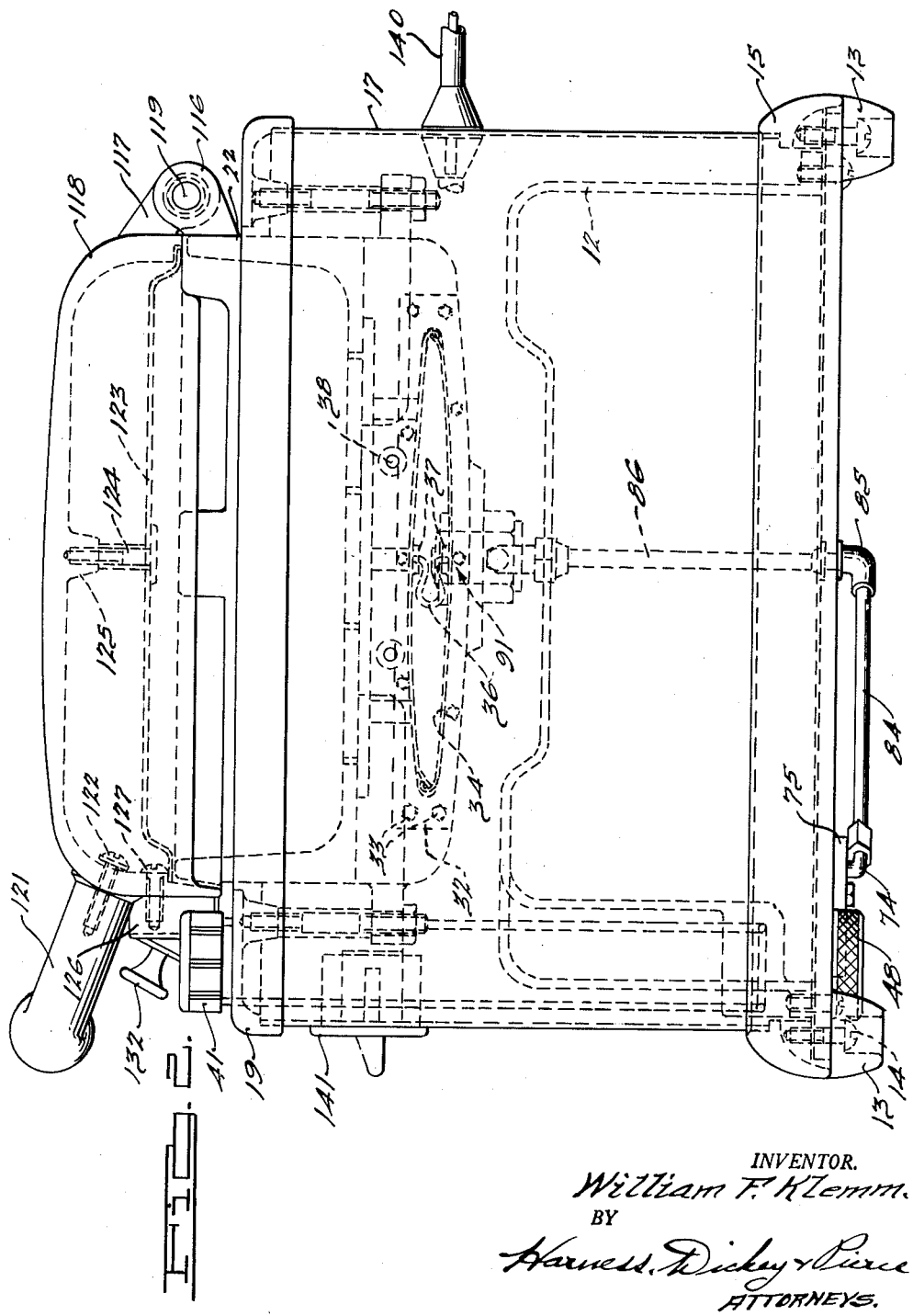

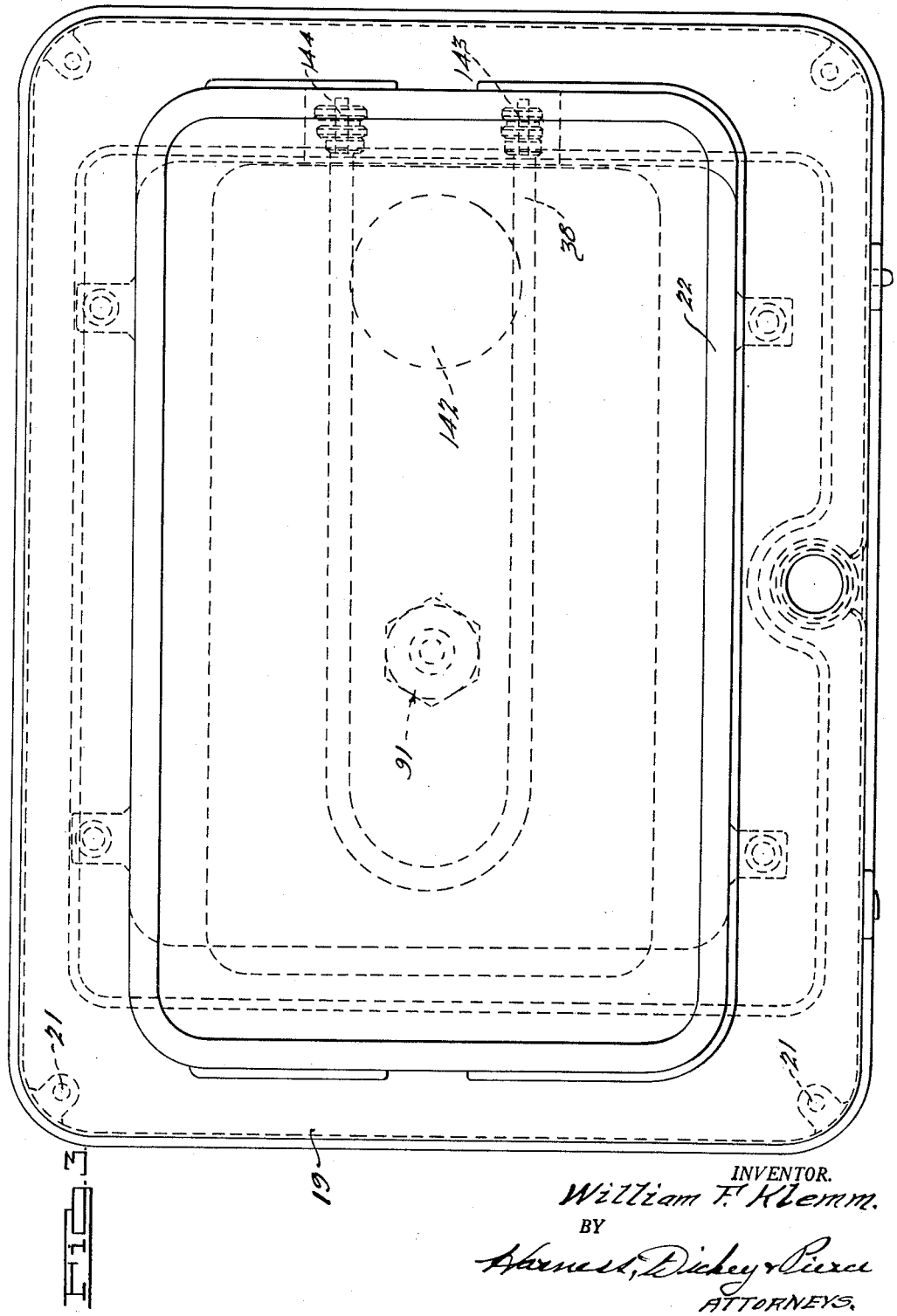

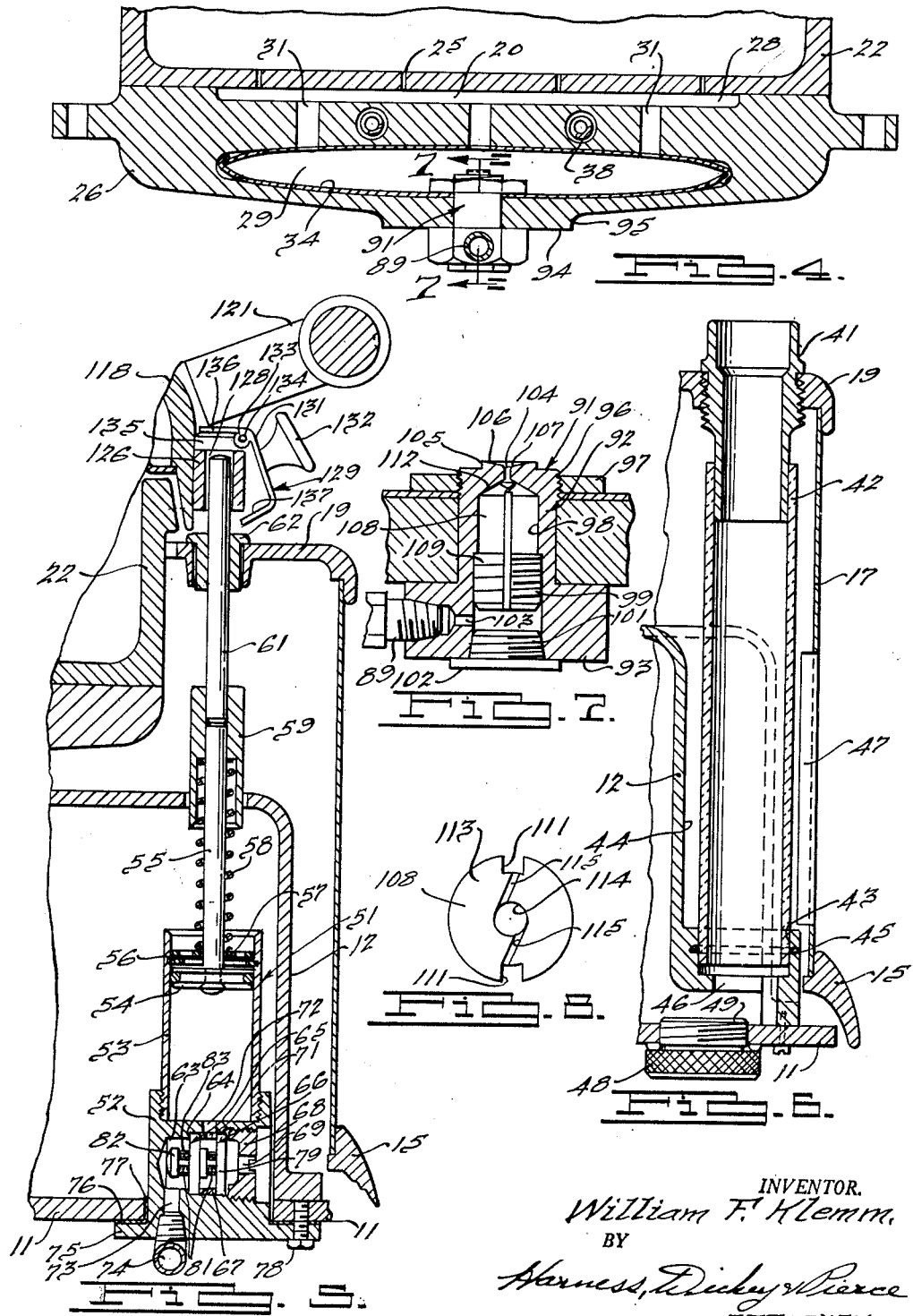

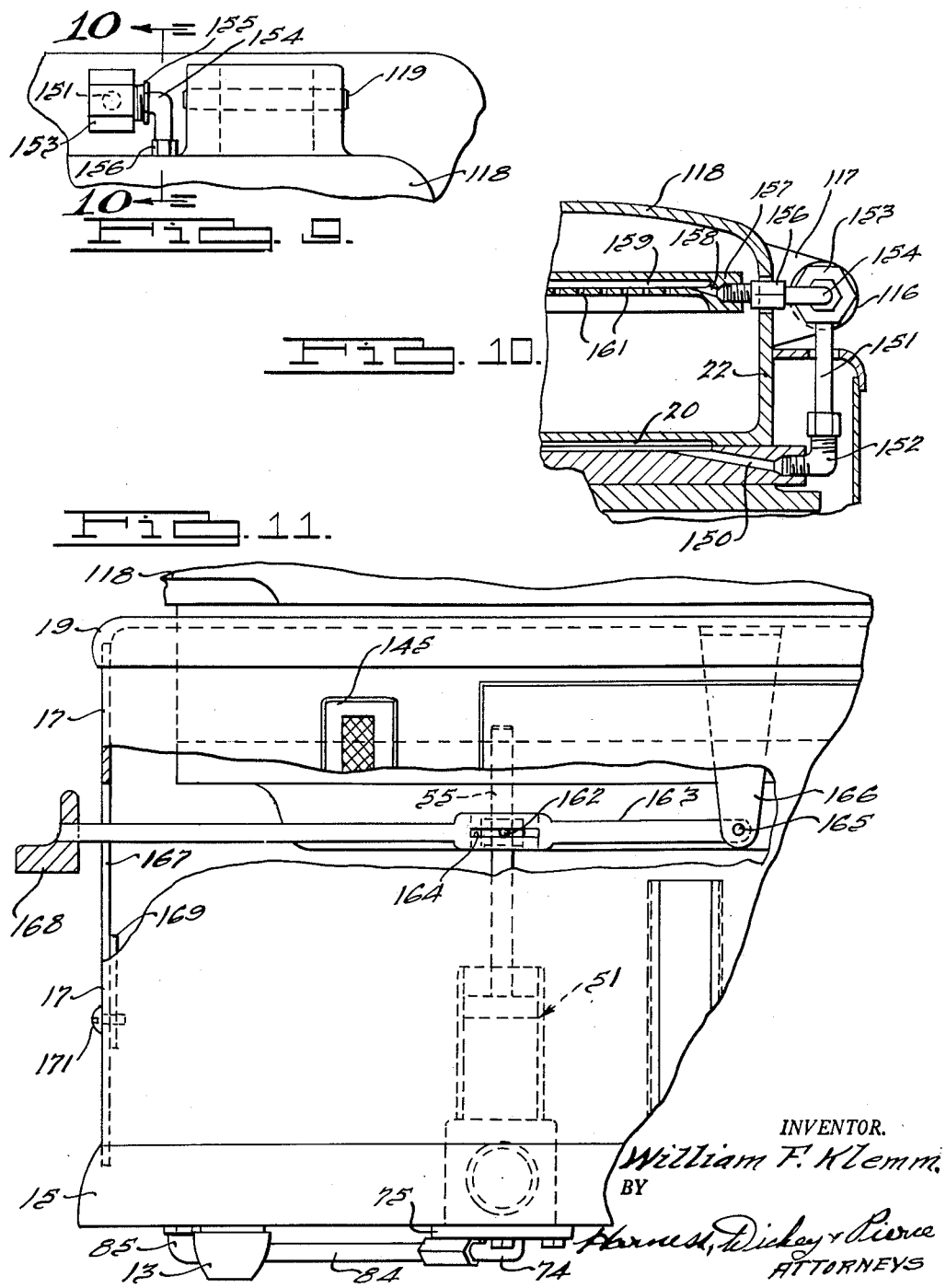

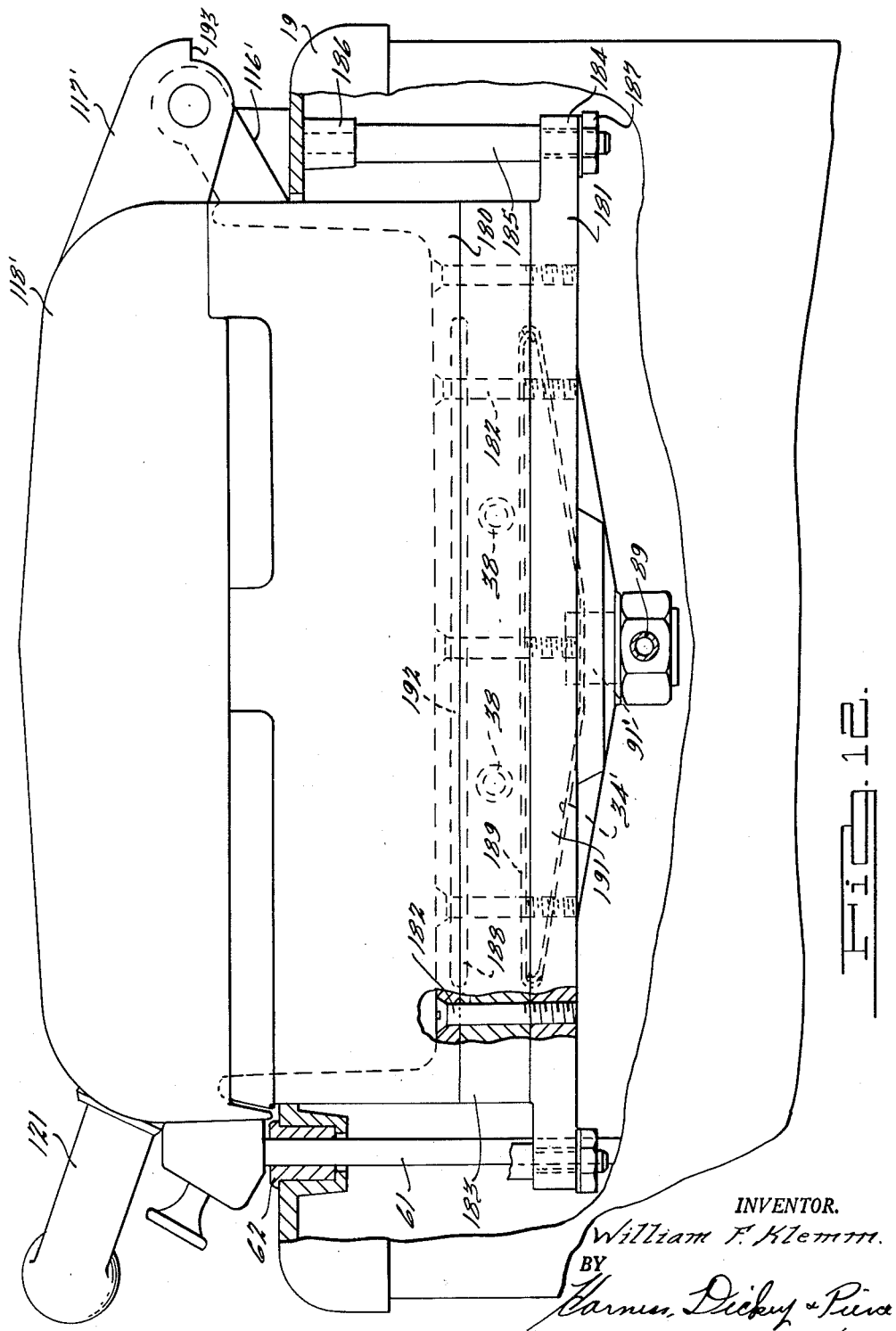

United States Patent Office 2,980,099
Patented Apr. 18, 1961

2,980,099

MOISTENING AND HEATING DEVICE

William F. Klemm, 17570 Prairie Ave., Detroit 4, Mich.

Filed May 24, 1954, Ser. No. 431,637

2 Claims. (Cl. 126—20)

This invention relates to article moistening and heating devices, and particularly to a moistening and heating device which employs steam for rapidly heating and moistening articles.

The invention embodies a water reservoir mounted on a base enclosed by a casing having a cover thereon. An article compartment is supported within the casing above the reservoir and has in the bottom thereof a plate containing a heating element for heating a lower compartment for producing steam when water is sprayed therein. The steam passes to an upper compartment where it becomes superheated and is forced through small openings into the article compartment either from the bottom or top thereof or from both the bottom and top. The superheated steam may be directed to a compartment in the cover above the article compartment having a plurality of fine apertures therein through which the steam is discharged into the article compartment from the top thereof. A removable sheath is placed within the steam compartment onto which the minerals and other matter contained within the water will be deposited when the water is changed to steam. The sheath may be removed from time to time and cleaned, thereby preventing the mineral and other matter from accumulating directly on the wall and insulate the compartment and plug the apertures through which the steam passes.

A plunger pump is mounted within the water reservoir which may be actuated by the cover during the last portion of its closing movement to deliver a metered quantity of water from the reservoir to the nozzle within the steam compartment when desired. Means is provided on the cover which is moved into and out of position of engagement with the top of the plunger so that the operator may select the time to produce the operation of the plunger pump when the lid is closed and it is desired to deliver steam to the article compartment. The plunger of the pump may be operated by a lever after the cover is closed to prevent any possible escape of the steam before the completion of the closing operation. A filler tube is provided on the casing having a transparent tube of glass, plastic, or other material, disposed adjacent to a slot through the casing so that the operator may be warned when the water is running low in the water tank. The bottom plate of the warmer has a drain plug so that the water tank can be drained of water and cleaned. A simple electric circuit is employed for controlling the heating element, one line thereof being connected to a switch which has a thermostat and heating element in series and has an "on" light disposed in parallel therewith so that neither the light nor the heating element can be energized unless the switch is closed.

Accordingly, the main objects of the invention are: to provide a moistening and heating device having an article compartment within a casing below which a superheating compartment and a steam compartment are provided communicating with each other and the article compartment through small apertures provided therebetween; to provide an article moistening and heating device having an article, a steam and a superheating compartment subject to the heat from a heating element which changes sprayed water in one compartment to steam which superheats the steam in a second compartment which is delivered into the article compartment either from the top or bottom thereof or from both the top and bottom, which heating element maintains the articles heated thereafter; to provide an article-moistening and heating device having an article compartment with a water tank therebelow containing a plunger pump which is maintained cool by the water and which may be operated to direct a predetermined amount of water through a spray nozzle into a steam-forming compartment where it is rapidly changed to steam and passed to a second compartment where is is superheated by a common heating element which also heats the article compartment into which the superheated steam is delivered; to provide a sheath encompassing the wall of a steam compartment which is removable therefrom so that it may be cleaned of the deposits which occur from the water when converted to steam, and, in general, to provide a moistening and heating device which is simple in construction, positive in operation and economical of manufacture.

Other objects and features of novelty of the invention will be specifically pointed out or will become apparent when referring, for a better understanding of the invention, to the following description, taken in conjunction with the accompanying drawings, wherein:

Figure 1 is a view in front elevation of a moistening and heating device embodying features of the present invention;

Fig. 2 is a view of the structure illustrated in Fig. 1, taken from the right-hand end thereof;

Fig. 3 is a plan view of the structure illustrated in Fig. 1, with the cover and supporting plate removed;

Fig. 4 is a sectional view of the structure illustrated in Fig. 1, taken on the line 4—4 thereof;

Fig. 5 is a broken sectional view of the structure illustrated in Fig. 1, taken on the line 5—5 thereof;

Fig. 6 is a broken sectional view of the structure illustrated in Fig. 1, taken on the line 6—6 thereof;

Fig. 7 is an enlarged, broken sectional view of the structure illustrated in Fig. 4, taken on the line 7—7 thereof;

Fig. 8 is an enlarged plan view of the plug illustrated in the structure of Fig. 7;

Fig. 9 is a broken plan view of the structure illustrated in Fig. 1, showing a modified form of the invention;

Fig. 10 is a sectional view of the structure illustrated in Fig. 9, taken on the line 10—10 thereof;

Fig. 11 is a broken sectional view of structure, similar to that illustrated in Fig. 2, showing a further form of the invention; and Fig. 12 is a broken view with parts in section of structure similar to that illustrated in Fig. 2, showing a further form of the invention.

Referring to Figs. 1 to 7 inclusive, the moistening and heating device of the present invention is illustrated as embodying a flat base plate 11 to which an inverted container 12 is secured forming a closed water reservoir. The base is supported upon four feet 13 of nonmarring material which is secured thereto by screws 14. The base extends laterally and supports a trim ring 15 having a shouldered recess 16 for receiving a sheet metal casing 17, the top of which extends into a shouldered recess 18 of a top plate 19. A plurality of screws 21 draw the top plate 19 downwardly toward the base plate 11 and thereby secure the casing 17 to the trim ring 15.

A moistening and heating tray 22 is supported on the top plate 19 by a plurality of studs 23 and nuts 24. The bottom of the tray has a plurality of fine apertures 25 extending therethrough. A casting 26 is secured to the bottom of the heating tray 22 by a plurality of screws 27. The casting 26 has a recess 28 therein forming a chamber 20 for superheating the steam generated in a chamber 29 in the bottom portion of the casting. A plurality of apertures 31 extend between the two chambers so that steam may pass from one to the other. The chamber 29 extends substantially the length of the plate having one end open and enclosed by a removable plate 32 which is secured in position by screws 33. The chamber 29 is of oval shape, as clearly illustrated in Fig. 4, and has a pair of thin interlocking plates 34 covering the inner surface thereof. The plates have interlocking tongues 35, as illustrated in Figs. 1 and 4, which retain the plates together but permit them to be separated after removal so that they may be cleaned. A pivoted bail 36 is secured in apertures in embossed portions 37 of the plates, which permits the plates to be drawn from the chamber 29 for cleaning purposes.

A heating element 38, preferably of the sheath-resistance type, is embedded within the casting 26 and is located between the two chambers 20 and 29 so as to have heat available not only to produce steam in the chamber 29 but to superheat the steam in the chamber 20 after it passes therein through the apertures 31. The heat from the element is also used to maintain the articles at a predetermined temperature after being heated by the superheated steam. The residue from the water when turned into steam will settle upon the wall of the plates 34, which plates may be removed from time to time and cleaned to prevent the accumulation from insulating and deleteriously affecting the operation of the device.

Referring to Fig. 6, a fill tube 41 is threaded into the top plate 19 having extending therefrom a transparent tube 42 which is sealed to an aperture 43 in the base of an indented portion 44 of the water reservoir 12 by an O-ring 45 disposed in a groove within the aperture 43. An aperture 46 is provided in the bottom of the indented portion 44 so that water may pass within the tank when poured into the fill tube 41. An elongated aperture 47 is provided in the wall of the casing 17 adjacent to the transparent tube 42 so that the depth of the water within the water reservoir may be gauged through the opening. A plug 48 is threaded in the base plate 11 of the reservoir for sealing a drain opening 49.

Referring to Fig. 5, a pump 51 is mounted within the water reservoir, the pump having a valve body 52 to which a cylinder 53 is threaded. A piston 54 is mounted in the cylinder supported on the end of a stem 55 and limited in its upward movement by a snap ring 56 extending into a slot within the wall of the cylinder 53 near the top thereof. A washer 57, having apertures therethrough for permitting the air above the piston to escape, rests upon the ring 56 and is retained thereon by a spring 58, the opposite end of which is disposed within an aperture in a sleeve 59. An operating rod 61 is secured to the sleeve 59 and extends through a guide bushing 62 mounted in the top plate 19. The valve body 52 has a horizontal aperture 63 therein containing a shoulder 64 against which a pair of valves 65 and 66, spaced by a sleeve 67, are retained by a threaded plug 68. The plug has an inlet aperture 69 therethrough through which water is drawn upon the upward movement of the piston. The water passes through the valve 66, through an aperture 71 in the sleeve 67, through the aperture 72 in the valve body 52 which is aligned with the aperture 71, into the interior of the cylinder 53 upon the upward movement of the piston produced by the spring 58. Upon the downward movement of the piston, the water within the cylinder is forced through the apertures 72, 71, through the valve 65, through the outlet aperture 73, into the elbow 74 which is threaded within the valve body.

The bottom of the valve body has an extending flange 75 which is secured against a gasket 76 and supported on the bottom plate 11 when extending through an aperture 77 in the plate and secured thereto by a plurality of screws 78. The valves 65 and 66 are of the standard type having a casing 79 containing an annular seat and a disk-shaped valve which is urged on the seat by a spring 81, one end of which engages the valve, the opposite end of which engages a head 82. The head is supported on the body portion 79 by a plurality of spaced ribs 83 between which the water passes when the valve is opened. The elbow 74 is joined to a tube 84 which is connected by an elbow 85 to a tube 86 which is connected by an elbow 87 to a tube 88 which is joined to a tubular extension 89 on a nozzle 91. The tubes 84, 86 and 88, joined by the elbows 85 and 87, are separable from each other so that the parts may be readily assembled or disassembled, as the case may be.

The nozzle as illustrated in Figs. 4, 7 and 8 comprises a cylindrical body 92 having a hexagonal head 93 which abuts against the face 94 of a boss 95 in the bottom central portion of the casting 26. The opposite end of the body 92 contains a thread 96 and a nut 97 which clamps the body portion to the wall of the casting 26, with the delivery end disposed within the chamber 29. The bottom portion of the plate 34 is clamped within the chamber by the nut 97 which must be removed to permit the body 92 to be moved downwardly to permit the plate 34 to be moved from the chamber for renewal or replacement. The body portion has a central cylindrical aperture 98 containing a straight thread 99 and a tapered thread 101 at the open end which is sealed by a plug 102. The tubular extension 89 communicates with a passageway 103 in the head 93 and the central aperture 98 within the body. The aperture 98 communicates with a small outlet opening 104 in the top of the body portion. A cylindrical extension 105 at the end of the body portion, through which the aperture 104 passes, has a conical sloping surface 106 which is disposed at an angle of substantially 160°. This surface is joined with the surface of the opening 104 by an arcuate portion 107 having a radius of approximately 3/64 of an inch.

A plug 108, having a thread 109 thereon, is secured within the opening 98 through the engagement of the threads 109 with the thread 99 within the aperture 98. A small passageway 111 is provided on diametrically opposite sides of the plug cutting through the thread 109 thereof, the apertures being in the order of approximately .045" square in section. A conical wall 112 of approximately 120° is provided at the end of the aperture 98 within the body 92 and the top of the plug has a similar conical surface 113 which mates with the conical surface 112. Centrally of the conical surface 113, a semispherical aperture 114, struck on a radius of approximately 1/16", is provided. Passageways 115 are cut in the conical wall 113 extending the passageways 111 to the central semispherical opening 114. These passageways are rectangular in cross section, having a dimension of approximately .025" wide times .035" deep. The passageways 115 are disposed tangentially relative to the semispherical opening 114 to cause the swirling of the water within the semispherical aperture 114 as it passes thereinto and passes therefrom through the passageway 104. This causes the water to adhere to the cone-shaped surface 106 of the extension 105 and pass substantially laterally outwardly from the edge of the extension to fill all parts of the chamber 29. This fine spray of the metered water will immediately turn to steam which will pass through the passageways 31 into the superheating chamber 20 where it will be superheated before passing through the small openings 25 into the article-heating cavity 22 of the casting 26. The detailed dimensions of the nozzle were given by way of example but are not to be considered limiting as these will vary depending on the size of the nozzle and the direction in which the spray leaves the edge of the extension 105. By changing the angle of the conical surface 160, the spray may be directed upwardly, horizontally and even downwardly below a horizontal surface.

The cavity 22 has a pair of hinge elements 116 extending from the top portion of the rear wall thereof which are joined to a pair of hinge elements 117 of a cover 118 by pins 119. The cover is of inverted dish shape and extends over the top edges of the casting 26 at the sides and front thereof, as clearly illustrated in Figs. 1 and 2. A handle 121 is secured to the front of the cover 118 by screws 122. A plate 123 extends across the cover and is secured in position by a screw 124 threaded into a boss 125 within the interior of the cover 118. When the operator grasps the handle 121, the cover 118 may be raised to swing about the pins 119 to provide access to the article compartment 22 of the casting 26.

As illustrated more clearly in Figs. 1, 2 and 5, a boss 126 is secured to the front of the cover 118 by screws 127. The boss contains an aperture 128 through which the upper end of the stem 61 may extend when the cover is in closed position. The boss has a pivoted element 129 thereon which in one position extends over the bottom of the aperture 128 to cause the end of the stem 61 to be engaged by the element 129, to thereby force the stem downwardly as the cover is moved to closed position near the end of its travel. The element 129 embodies a strap having a main portion 131 to which an operating knob 132 is secured. A pair of extending ears 133 has a pin 134 extending therethrough and through a projection 135 on the boss 126. Beyond the ears a projecting portion 136 forms a stop for limiting the outward pivoted movement of the main portion 131 of the element. The portion 131 has a right-angle flange 137 at the lower edge which forms the stop portion of the element when the body portion 131 is moved against the boss 126. When the knob 132 is held outwardly as the cover is closed, the pump 51 is not operated. When the knob is moved inwardly to have the body portion 131 engage the boss 126, the flange 137 covers the opening 128 of the boss and engages the top of the stem 61 and forces it downwardly at the end of the closing movement of the cover. This downward movement of the stem causes a metered amount of water to be forced into the chamber 29 and a predetermined amount of steam to be produced therewithin which is superheated within the chamber 20 from which it passes into the article compartment 22 of the casting 26. Accordingly, the operator may control the introduction of steam into the article compartment wherein the article will be retained heated by the heating element 38 controlled by a thermostat, as hereinafter described.

A service cord 140 passes through the back wall portion of the casing 17, as illustrated in Fig. 2, one lead of which is connected to a switch 141 mounted in the front wall of the casing 17. The other lead of the cord is connected to one terminal of a thermostat 142 which is mounted on the bottom of the casting 26. The opposite terminal of the thermostat is connected to a terminal 143 of the heating element 38, the other terminal 144 thereof being connected to the terminal of the switch 141. The terminal of the switch is connected to a terminal of a lamp in rear of a window 145 mounted in the front wall of the casing 17, the adjacent terminal of the lamp being connected to the terminal of the thermostat to which the lead of the conductor was connected so that the lamp will be in parallel circuit relation to the thermostat and heating element. When the switch is moved to "on" position, the lamp and heating element will be energized, the latter through the thermostat 142, which may be adjusted to maintain the proper temperature of the casting 26, both for producing and superheating the steam and for maintaining the article compartment at a predetermined temperature.

Referring to Figs. 9 and 10, where desirable the superheated steam may also be introduced into the heat compartment downwardly from the interior of the cover 118, either simultaneously with the introduction of the steam through the bottom thereof or solely from the cover when the apertures 25 are eliminated in the casting 26. In this arrangement, the chamber 20 is connected by a passageway 150 to a tube 151 by an elbow 152. The tube 151 is connected to a hexagonal bushing 153 having an axial passageway therein to which an elbow-shaped tube 154 is sealed by a packing gland 155. The opposite end of the tube 154 is connected to a fitting 156 which is threaded into a plate 157 mounted within the cover 118. A passageway 158 directs the superheated steam from the tube 154 and fitting 156 to a compartment 159, the bottom wall of which contains a plurality of small apertures 161 through which the superheated steam passes downwardly into the article compartment 22 of the casting 26. It will be noted in this arrangement that the center of the packing glands 155 is aligned with the center of the pins 119 of the hinge elements 116, 117 so that the elbows 154 may swing with the cover when moved to open and closed positions. It is to be understood that the fitting and tubular connections may be applied adjacent to each of the hinges 116, 117 of the cover so that the superheated steam will be delivered to points which are spaced from each other and the ends of the compartment 159.

A further form of the invention is illustrated in Fig. 11, wherein a manually operated lever is provided for operating the pump 51. In this arrangement, the piston stem 55 is connected by a pin 162 to a lever 163, with the pin extending within a slot 164 in the lever. One end of the lever is secured by a pivot 165 to a bracket 166, while the opposite end extends through a slot 167 in the forward wall of the casing 17. The forwardly extending end of the lever has a handle 168 provided thereon by which the lever is moved downwardly and upwardly. With this arrangement, water may be metered into the chamber 29 at any time without the necessity of raising the cover as is required when the stem 61 is moved downwardly upon the closing of the cover and upwardly by the spring 58 when the cover is raised. In the arrangement illustrated in Fig. 11, the spring may be eliminated as the piston rod 55 will be moved to its upward position upon the upward movement of the handle 168 by the operator. An adjustable plate 169 may be provided across the bottom portion of the opening 167, secured in position by one or more screws 171 extending through vertical slots in the casing 17. By adjusting the plate 169 vertically, the amount of water to be delivered to the chamber 29 each time the handle 168 is moved downwardly may be accurately metered.

The article moistening and heating device has many applications. It procures the rapid moistening and heating of buns, "hot dogs" and buns, canned soups, frozen and other types of foods, polio cloths and blanket applicators, sterilization of articles and fabrics, and the like. It may take other forms than that herein illustrated, depending upon the size of the articles and the time requirement thereof. The specific structure herein illustrated and described is by way of example and not to be considered limiting, as pointed out above.

In Fig. 12 a further form of device is illustrated that wherein the heating tray 180 is secured to a bottom supporting plate 181 by screws 182 which pass through apertures in an intermediate plate 183 and secure the three plates together. The corners of the plates 181 have extending bosses 184 through which extend the threaded ends of studs 185 which are threaded in bosses 186 of the top frame member 19. Nuts 187 on the threaded ends of the studs 185 secure the bosses 184 against shoulders of the studs 185 to form a unit rigid construction. It will be noted that the intermediate plate 183 has recesses 188 and 189 forming part of the steam forming chamber 191 and the steam superheating chamber 192. The pair of interlocking plates 34' extends over the walls of the steam forming compartment 191 in removable relation thereto. The nozzle 91' is disposed centrally of the sloping recess in the bottom plate 181 having the conduit 89 connected thereto. Otherwise the construction is the same as that hereinabove described in relation to Figures 1 to 11 inclusive. It will be noted further in this arrangement that the hinge element 117' has a stop shoulder 193 which abuts against the hinge element 116' to limit the angular opening movement of the cover 118'.

What is claimed is:

1. In a device for moistening and heating articles, an element of good heat conducting material having an open article-heating compartment, a steam-forming compartment and a steam-superheating compartment formed therein, said steam-forming and steam-superheating compartments being in communication with each other through a plurality of apertures disposed therebetween, said steam-superheating compartment being in communication with said article-heating compartment through a plurality of apertures disposed therebetween, a common heating means supported by said element between said steam-forming and steam-superheating compartments, means connected to said element for introducing water into the steam-forming compartment from which steam produced therefrom passes into the adjacent steam-superheating compartment where it is super-heated and from which it is delivered to said article-heating compartment, a closure for said article-heating compartment, and a removable wall of thin material within the steam-forming compartment for collecting the residue from the water when converted into steam, said wall having perforations adjacent to the apertures of said steam-forming compartment.

2. A device having an article-receiving compartment, a cover for enclosing said compartment, said device having a steam-forming compartment and a steam-superheating compartment adjacent to each other and to said article-receiving compartment, a heater supported by said device for heating said compartments, a water-delivering nozzle secured to said device and communicating with the steam-forming compartment, said steam-forming and steam-superheating compartments being joined by passageways for steam, said steam-superheating compartment and article-receiving compartments being joined by passageways for steam, means connected to said device for delivering a predetermined amount of water through said nozzle to said steam-forming compartment, and a collapsible wall of thin material containing perforations secured within the steam-forming compartment over substantially all of the wall area thereof in a manner to be removable therefrom.

References Cited in the file of this patent

UNITED STATES PATENTS

| Number | Name | Date |
|---|---|---|
| 378,663 | Davidson | Feb. 28, 1888 |
| 662,544 | Okell | Nov. 27, 1900 |
| 802,601 | Scanlan | Oct. 24, 1905 |
| 1,032,532 | Constantinescu | July 16, 1912 |
| 1,154,993 | Kercher | Sept. 28, 1915 |
| 1,377,726 | Pentz | May 10, 1921 |
| 1,586,761 | Shepherd | June 1, 1926 |
| 1,650,128 | Hubbard | Nov. 22, 1927 |
| 1,669,183 | Wilson | May 8, 1928 |
| 1,876,614 | Claus | Sept. 13, 1932 |
| 1,959,788 | Hunkele | May 22, 1934 |
| 2,060,434 | Vincent | Nov. 10, 1936 |
| 2,622,186 | Hutchens | Dec. 16, 1952 |
| 2,636,969 | Lewis | Apr. 28, 1953 |
| 2,674,935 | Lewis | Apr. 13, 1954 |
| 2,719,211 | Lewis et al. | Sept. 27, 1955 |
| 2,720,998 | Potter | Oct. 18, 1955 |

FOREIGN PATENTS

| Number | Country | Date |
|---|---|---|
| 6,142 | Great Britain | 1884 |
| 22,136 | Great Britain | 1910 |
| 195,456 | Great Britain | Apr. 3, 1938 |
| 467,523 | Great Britain | June 18, 1937 |